United States Patent
Suese

(10) Patent No.: US 9,158,456 B2
(45) Date of Patent: Oct. 13, 2015

(54) DISPLAY INPUT APPARATUS AND IMAGE FORMING APPARATUS HAVING THE SAME

(71) Applicant: KYOCERA Document Solutions Inc., Osaka (JP)

(72) Inventor: Narihiko Suese, Osaka (JP)

(73) Assignee: KYOCERA Document Solutions Inc., Osaka (JP)

(*) Notice: Subject to any disclaimer, the term of this patent is extended or adjusted under 35 U.S.C. 154(b) by 0 days.

(21) Appl. No.: 14/525,980

(22) Filed: Oct. 28, 2014

(65) Prior Publication Data

US 2015/0116748 A1 Apr. 30, 2015

(30) Foreign Application Priority Data

Oct. 31, 2013 (JP) ................................ 2013-226805

(51) Int. Cl.

| | |
|---|---|
| G06K 15/00 | (2006.01) |
| G06F 3/0488 | (2013.01) |
| G06F 3/0484 | (2013.01) |
| G06F 3/041 | (2006.01) |
| H04N 1/00 | (2006.01) |
| G03G 15/00 | (2006.01) |
| G06F 3/0482 | (2013.01) |
| G06F 3/0483 | (2013.01) |

(52) U.S. Cl.
CPC .......... *G06F 3/04886* (2013.01); *G03G 15/502* (2013.01); *G06F 3/041* (2013.01); *G06F 3/0482* (2013.01); *G06F 3/0483* (2013.01); *G06F 3/04847* (2013.01); *H04N 1/00392* (2013.01); *H04N 1/00411* (2013.01); *H04N 1/00419* (2013.01); *G06F 2203/04803* (2013.01); *H04N 2201/0094* (2013.01)

(58) Field of Classification Search
CPC . H04N 1/00392; H04N 1/00411; G06F 3/041
See application file for complete search history.

(56) References Cited

U.S. PATENT DOCUMENTS

| | | | | |
|---|---|---|---|---|
| 6,333,753 B1* | 12/2001 | Hinckley | ...................... | 715/768 |
| 8,649,064 B2* | 2/2014 | Hasegawa | ..................... | 358/3.26 |
| 8,769,438 B2* | 7/2014 | Mangum et al. | .............. | 715/853 |
| 8,891,109 B2* | 11/2014 | Hasegawa | ..................... | 358/1.15 |
| 2003/0169286 A1* | 9/2003 | Misawa | .......................... | 345/716 |
| 2006/0161847 A1* | 7/2006 | Holecek et al. | ............... | 715/716 |
| 2007/0258655 A1* | 11/2007 | Motominami | ................ | 382/254 |
| 2007/0285573 A1* | 12/2007 | Ichikawa | ....................... | 348/571 |
| 2008/0109753 A1* | 5/2008 | Karstens | ........................ | 715/802 |
| 2010/0134835 A1* | 6/2010 | Hasegawa | ..................... | 358/1.15 |
| 2010/0182248 A1* | 7/2010 | Chun | ............................. | 345/173 |
| 2011/0037690 A1* | 2/2011 | Kelly | ............................. | 345/156 |
| 2012/0084706 A1* | 4/2012 | Sirpal et al. | .................... | 715/778 |

(Continued)

FOREIGN PATENT DOCUMENTS

JP 2009-75694 A 4/2009

*Primary Examiner* — Ted Barnes
(74) *Attorney, Agent, or Firm* — Stein IP, LLC

(57) ABSTRACT

A display input apparatus comprises a display portion and a touch panel portion. When the touch panel portion accepts a first operation, the display portion sets a screen in current display as a shift start screen, sets a one-more downward layer screen than the shift start screen as a shift target screen, and gradually shifts the display screen from the shift start screen to the shift target screen. Besides, when the first operation is continued on the touch panel portion, if there are a plurality of downward layer screens that are screens on a one-more downward layer than the shift target screen, the display portion displays a list screen that represents the plurality of downward layer screens in the same screen.

13 Claims, 15 Drawing Sheets

(56) References Cited

U.S. PATENT DOCUMENTS

2012/0162265 A1* 6/2012 Heinrich et al. .............. 345/661
2013/0201132 A1* 8/2013 Kunioka et al. ............... 345/173
2013/0271402 A1* 10/2013 Arakawa et al. .............. 345/173
2014/0258905 A1* 9/2014 Lee et al. ...................... 715/770
2014/0304612 A1* 10/2014 Collin ........................... 715/748
2015/0046864 A1* 2/2015 Fujii ............................. 715/771

* cited by examiner

USER MANAGEMENT/MANAGEMENT DIVISION — 92
USER MANAGEMENT
LOCAL AUTHENTICATION [CHANGE >] — B21(B)    B24(B)   B23(B)
LOCAL USER LIST [REGISTRATION·EDITION>]   LOCAL PERMISSION [CANCEL >]
                B22(B)   GUEST PERMISSION SETTING [CANCEL >]
                         EASY LOG-IN SETTING [CANCEL >]
                                             B25(B)
B2
[CANCEL]
                                          2015/11/5  15:15

ON THE REVERSE SHIFT

ON THE REVERSE SHIFT

EASY LOG-IN — 93
EASY LOG-IN ON [CANCEL >]    EASY LOG-IN INFORMATION [NEXT >]
                B31(B)                                B32(B)

B2
[CANCEL]
                                          2015/11/5  15:15

DISPLAY INPUT APPARATUS AND IMAGE FORMING APPARATUS HAVING THE SAME

INCORPORATION BY REFERENCE

The present application is based on and claims the benefit of priority from Japanese Patent Application No. 2013-226805 filed on Oct. 31, 2013, the contents of which are hereby incorporated by reference.

BACKGROUND OF THE INVENTION

The present disclosure relates to a display input apparatus and an image forming apparatus that includes the same.

Conventionally, as a display input apparatus, an operation panel is known which is installed in image forming apparatuses such as a multi-functional machine and the like. Such an operation panel accepts setting operations for functions such as a copy function, a fax function and the like that are incorporated in an image forming apparatus. For example, when accepting a setting operation for an incorporated function, the operation panel displays a screen for accepting the setting operation.

An image forming apparatus such as a multi-functional machine has a plurality of functions for which a setting value can be changed. Accordingly, there is a case where a screen for accepting setting operations for incorporated functions has a tree-like layer structure for every function.

In this case, the operation panel first displays the uppermost layer screen. For example, the uppermost layer screen is a screen that accepts a selection operation for selecting a desired function of the plurality of functions. And, upon accepting a selection operation on the uppermost layer screen, the operation panel shifts to the next layer screen where to accept a necessary setting operation. Here, for example, the operation screen accepts a setting operation for setting a value for an incorporated function. In the meantime, even thereafter, if there is a screen on a layer more downward than the screen in current display and it is necessary to accept a setting operation on the screen, the operation panel repeats a shift to downward layer screens and acceptance of setting operations on the screens after the shifts.

Usually, the screen displayed by the operation panel is provided with a screen switchover button for switching the display screen to a one-more downward layer screen. And, if the screen switchover button in the screen is operated, the operation panel switches the display screen to the one-more downward layer screen.

Here, there is a case where a user wants to confirm what a first downward layer screen on a one-more downward layer than the screen in current display is like. In this case, by operating the screen switchover button (which corresponds to the first downward layer screen) disposed in the screen in current display, it is possible to confirm the first downward layer screen (possible to display the first downward layer screen).

However, in a case where the user wants to confirm a second downward layer screen on a still one-more downward layer than the first downward layer screen, it is necessary to additionally operate a screen switchover button (which corresponds to the second downward layer screen) disposed in the first downward layer screen; accordingly, the number of operations increases, which is onerous and inconvenient for the user. Especially, in a case where there are a plurality of the second downward layer screens and the user wants to confirm two or more screens of the plurality of the second downward layer screens, it is necessary to repeat, many times, the operation for switching from the first downward layer screen to the second downward layer screen and the operation for returning from the second downward layer screen to the first downward layer screen; accordingly, the convenience becomes worse.

SUMMARY OF THE INVENTION

A display input apparatus according to a first aspect of the present disclosure includes a display portion and a touch panel portion. The display portion displays a screen that is provided with a button for switching a display screen to a one-more downward layer screen. The touch panel portion accepts a touch operation of touching the screen of the display portion. And, when the touch panel portion accepts a predetermined first operation during the display of the screen provided with the button, the display portion starts display in a gradual shift mode in which the display portion sets the screen in the current display as a shift start screen, sets a one-more downward screen than the shift start screen as a shift target screen, gradually erases the shift start screen, and gradually increases a display percentage of the shift target screen, whereby the display screen is gradually shifted from the shift start screen to the shift target screen. Besides, when the first operation is continued on the touch panel portion even after the shift to the shift target screen, if there are a plurality of downward layer screens that are screens on a one-more downward layer than the shift target screen, the display portion reduces sizes of the plurality of downward layer screens to sizes smaller than a usual screen size and displays a list screen that disposes the plurality of reduced-sized downward layer screens in the same screen.

An image forming apparatus according to a second aspect of the present disclosure includes the display input apparatus.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

As to an embodiment of the present disclosure, an example of a multi-functional machine is described which incorporates a plurality of functions such as a print function, copy function, a transmission function (e.g., fax function) and the like. In the meantime, such a multi-functional machine can execute a plurality of kinds of jobs such as a print job, a copy job, a transmission job (e.g., fax job) and the like.

<Whole Structure of Multi-Functional Machine>

Figure 1:
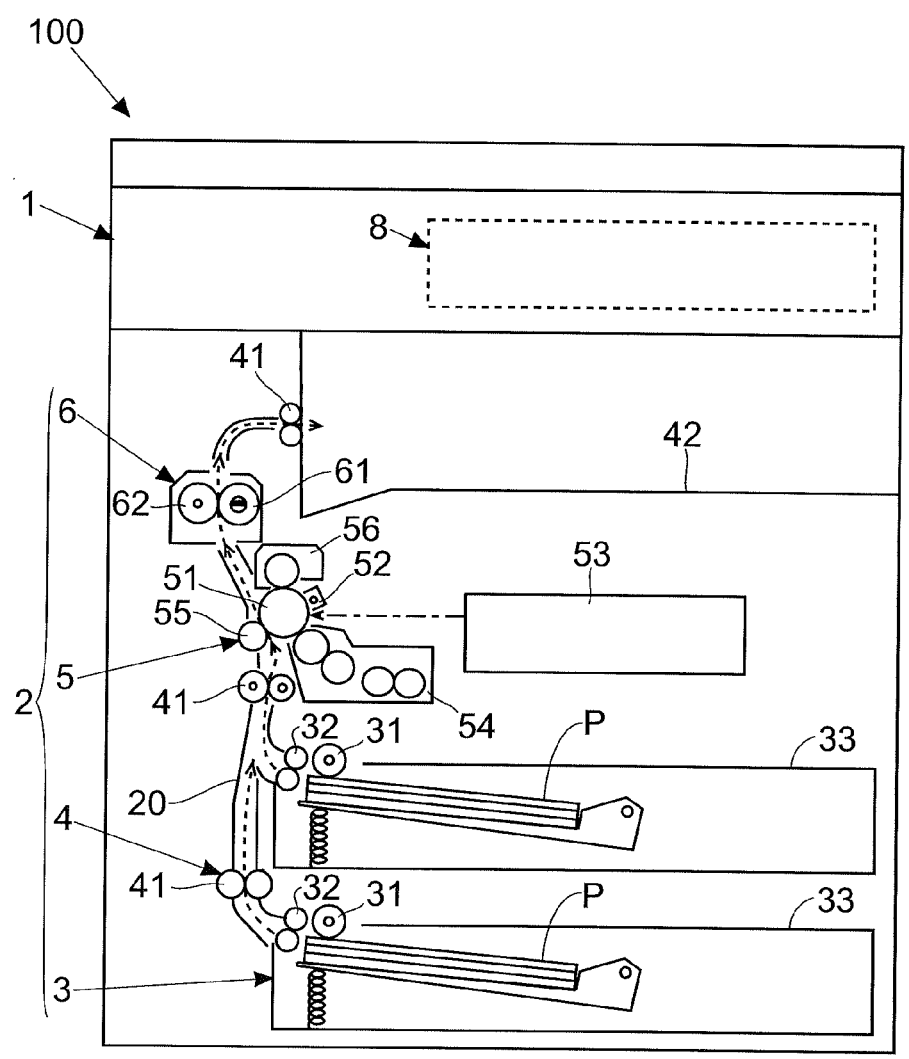
FIG. 1 is a schematic view of a multi-functional machine that includes an operation panel according to an embodiment of the present disclosure.

As shown in FIG. 1, a multi-functional machine 100 (which corresponds to an "image forming apparatus") includes an image reading portion 1 and a printing portion 2. The image reading portion 1 reads a document to generate image data. The printing portion 2 prints an image based on image data (e.g., image data obtained by reading of a document by the image reading portion 1) onto a paper sheet P and outputs the printed image.

The printing portion 2 is composed of a paper sheet feeding portion 3, a paper sheet conveying portion 4, an image forming portion 5, and a fixing portion 6. The paper sheet feeding portion 3 includes a pickup roller 31 and a pair of paper sheet feeding rollers 32, and a pair of paper sheet feeding rollers, and supplies the paper sheet P housed in a paper sheet cassette 33 to a paper sheet conveying path 20. The paper sheet conveying portion 4 includes a plurality of pairs of conveying rollers 41, conveys the paper sheet P along the paper sheet conveying path 20, and delivers the printed paper sheet P onto a delivery tray 42.

The image forming portion 5 includes a photosensitive drum 51, a charging device 52, an exposure device 53, a developing device 54, a transfer roller 55, and a cleaning device 56. And, the image forming portion 5 forms a toner image based on the image data, and transfers the toner image to the paper sheet P. The fixing portion 6 includes a heat roller 61 and a pressure roller 62, heats and pressures the toner image transferred to the paper sheet P to fix the toner image.

Figure 2:
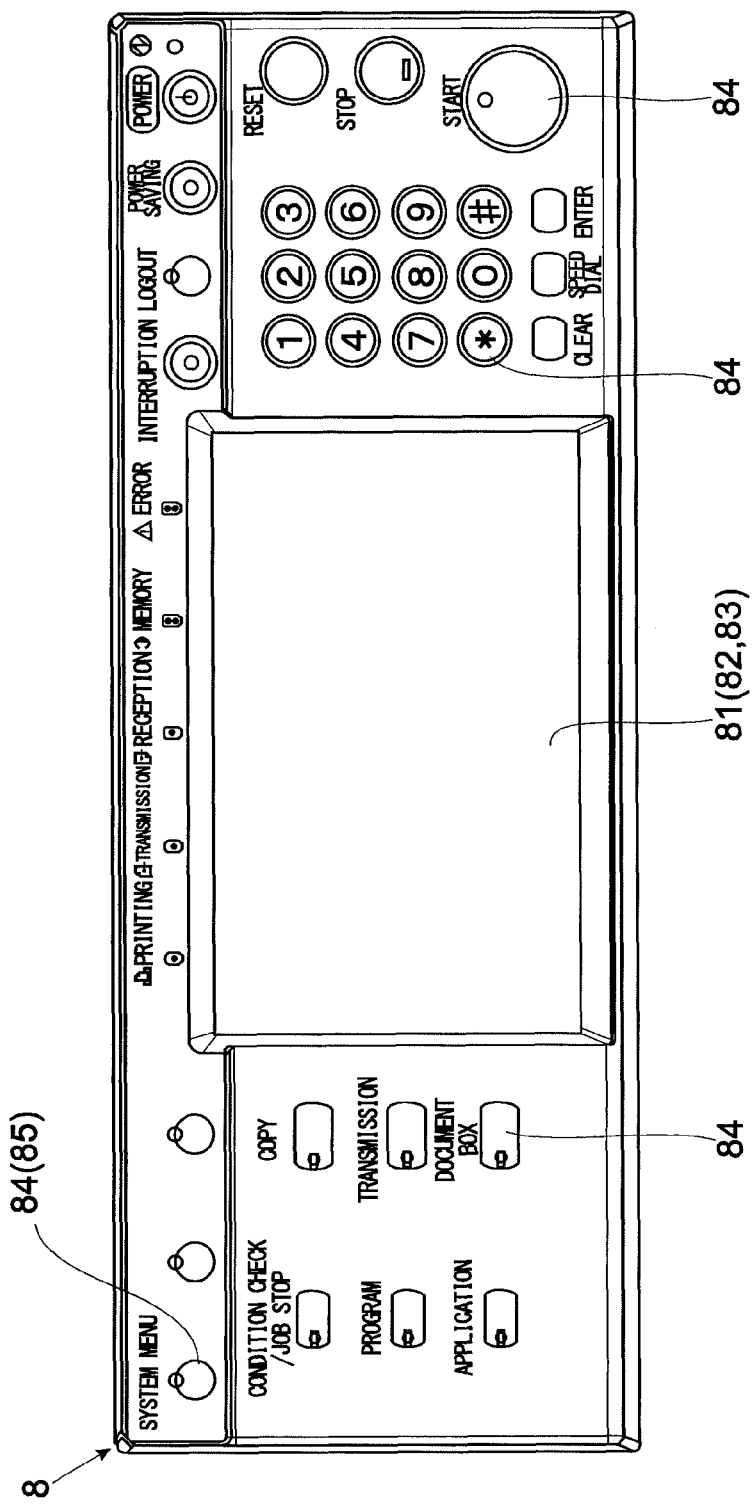
FIG. 2 is a plan view of an operation panel according to an embodiment of the present disclosure.

Besides, the multi-functional machine 100 includes an operational panel 8 shown in FIG. 2. The operation panel 8 is disposed on a front side (e.g., a place indicate by a broken line of FIG. 1) of the multi-functional machine 100. In the meantime, the operation panel 8 corresponds to a "display input apparatus."

The operation panel 8 is provided with an operation display portion 81. The operation display portion 81 includes a display portion 82 and a touch panel portion 83. The display portion 82 is a display panel such as a liquid crystal display panel, an organic EL display panel or the like. The touch panel portion 83 is a multi-touch panel that can detect simultaneously a plurality of touch positions, and is disposed to cover a display surface of the display portion 82. And, the operation display portion 81 displays buttons (software keys) for accepting various kinds of settings and a message on the display portion 82, and accepts various kinds of settings via the touch panel portion 83. In the meantime, the operation panel 8 is also provided with various kinds of hardware keys such as a start key, a stop key, a reset key, a ten key pad and the like.

<Hardware Structure of Multi-Functional Machine>

Figure 3:
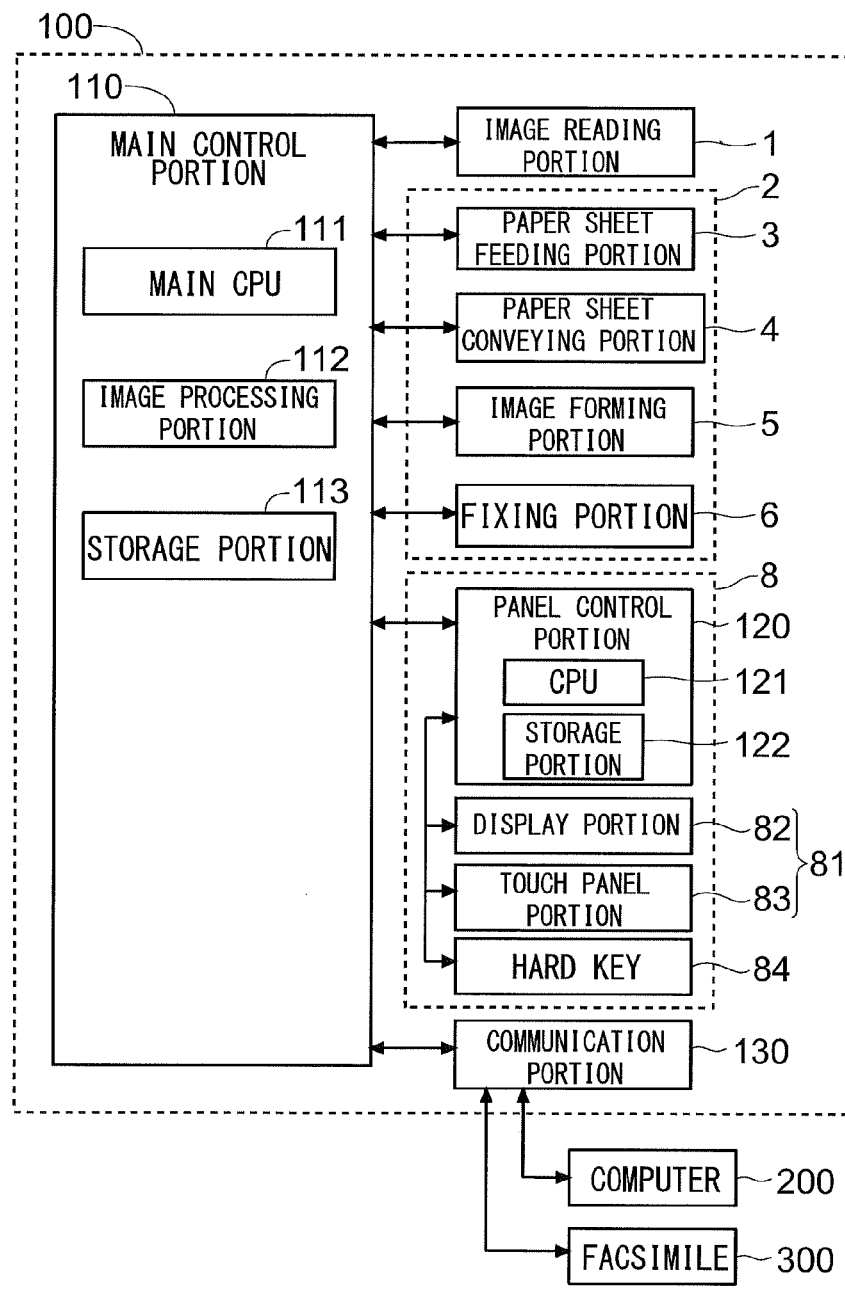
FIG. 3 is a block diagram for describing a hardware structure of a multi-functional machine that includes an operation panel according to an embodiment of the present disclosure.

As show in FIG. 3, the multi-functional machine 100 includes a main control portion 110. The main control portion 110 includes a main CPU 111, an image processing portion 112, and a storage portion 113. The image processing portion 112 includes an ASIC dedicated to image processing, and applies image processings (enlargement/reduction, concentration conversion, data format conversion and the like) to the image data. The storage portion 113 includes a ROM, a RAM and the like, and stores a program for control and data. And, the main control portion 110 controls operation of each portion of the multi-functional machine 100 based on the program and data stored in the storage portion 113.

Specifically, the main control portion 110 is connected to the image reading portion 1 and the printing portion 2 (paper sheet feeding portion 3, paper sheet conveying portion 4, image forming portion 5, and fixing portion 6). And, the main control portion 110 controls a reading operation of the image reading portion 1 and controls a printing operation of the printing portion 2.

Besides, the main control portion 110 is connected to a panel control portion 120. The panel control portion 120 includes a CPU 121 and a storage portion 122, receives instructions from the main control portion 110 to control a display operation of the operation panel 8 and detects an operation performed on the operation panel 8. For example, the panel control portion 120 makes the display portion 82 display a button (software key), if a touch operation is performed on the button, detects, based on an output from the touch panel portion 83, the button that accepts the touch operation. Besides, if a push-down operation of pushing down the hardware key 84 is performed, based on an output from a switch that is switched in on/off by the push-down of the hardware key 84, the panel control portion 120 detects the hardware key 84 that accepts the push-down operation. And, the panel control portion 120 detects the operation performed on the operation panel 8 and transmits the detection result to the main control portion 110. In this way, the main control portion 110 recognizes the operation performed on the touch panel 8.

Besides, the main control portion 110 is connected to a communication portion 130. The communication portion 130 is communicably connected to an external computer 200 via a network. According to this, it is possible to perform printing based on image data transmitted from the external computer 200 and also possible to transmit image data, which are obtained by reading of a document by the image reading portion 1, to the computer 200. Besides, the communication portion 130 may incorporate a modem and the like. In this case, it is possible to perform fax communication with an external facsimile 300 via a network such as a telephone line or the like.

<Usual Switchover of Display Screen>

Figure 4:
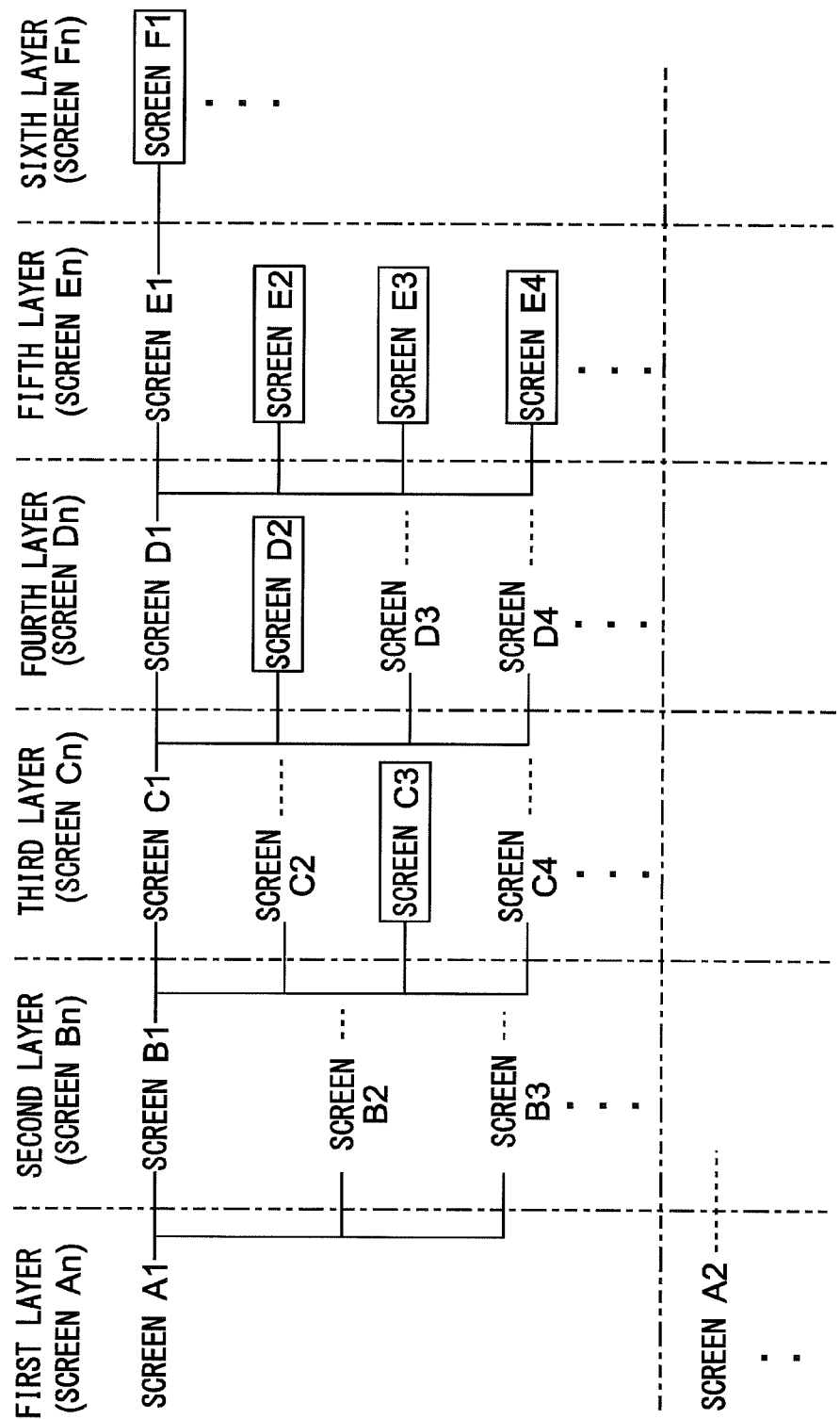
FIG. 4 is a view showing a layer structure of a screen displayed on an operation panel according to an embodiment of the present disclosure.

As shown in FIG. 4, the screen displayed on the operation panel 8 has a layer structure, and the screen is provided therein with a button (software key) for switching a display screen ton a one-more downward layer screen. And, by operating the button disposed in the screen, it is possible to perform a shift from the screen in current display to a one-more downward layer screen (hereinafter, called a downward layer screen) than the screen in the current display. For example, if a button disposed in a screen A1 is operated during display of a screen An (e.g., screen A1) on a first layer that is the uppermost layer, a screen Bn (e.g., screen B1), which is one of second layer screens Bn that are downward layer screens of the screen A1 and corresponds to the operated button, is displayed, and if a button disposed in the screen B1 is operated, a screen Cn, which is one of third layer screens Cn that are downward layer screens of the screen B1 and corresponds to the operated button, is displayed.

In the meantime, in FIG. 4, screens (screen C3, screen D2, screens E2 to E4, and screen F1) enclosed by a frame as a mark are screens that are not provided with a button for performing a shift to a downward layer screen from the screens, and end screens on a screen shift route. For example, the end screen is a screen for fixing content (or content set on the end screen) that is set on a screen on a shift route that extends to the end screen.

Hereinafter, as a specific example, with reference to FIG. 5 to FIG. 10, a case is described where system setting (setting concerning an easy log-in function) of the multi-functional machine 100 is performed.

Figure 5:
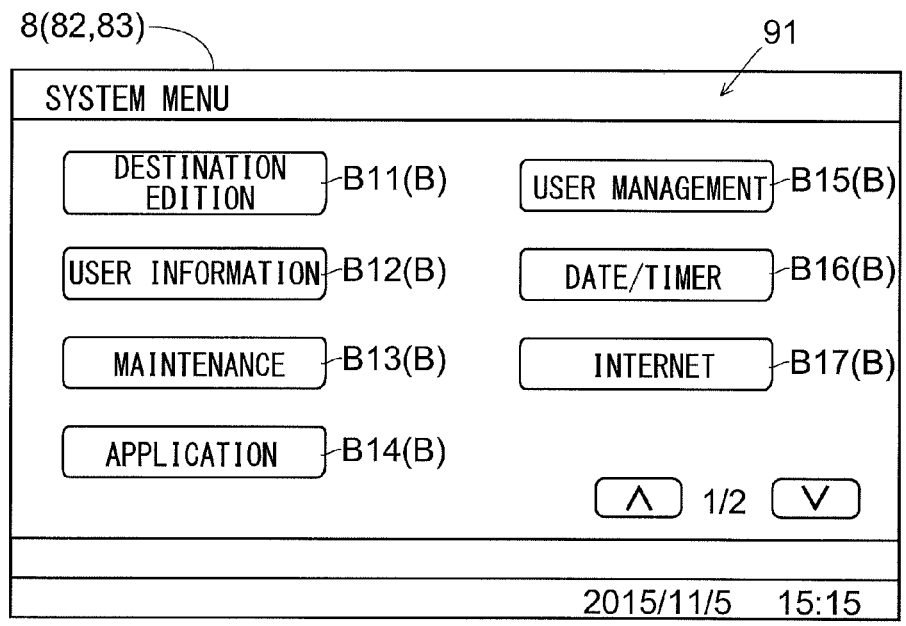
FIG. 5 is a view showing an example of a screen displayed on an operation panel according to an embodiment of the present disclosure.
Figure 6:
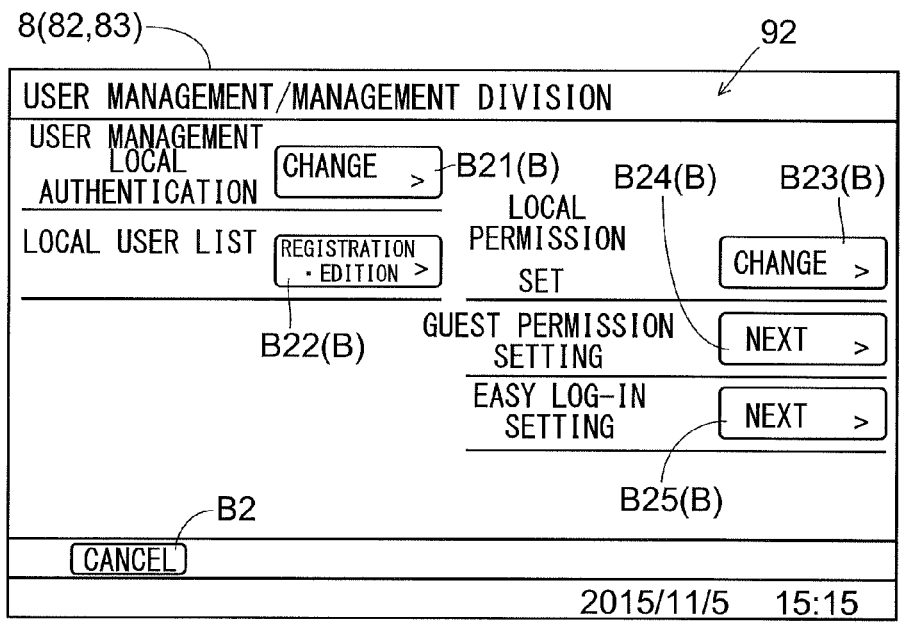
FIG. 6 is a view showing an example of a screen displayed on an operation panel according to an embodiment of the present disclosure.

First, upon detecting a push-down operation on a system menu key 85 (see FIG. 2) that is one of the hardware keys 84, the panel control portion 120 makes the display portion 82 display a system menu screen 91 shown in FIG. 5. In the meantime, the system menu screen 91 is a screen on the uppermost layer of screens for performing the system setting. In other words, the system menu screen 91 corresponds to the first layer screen An in FIG. 4.

The system menu screen 91 is provided with a plurality of setting item buttons B11 to B17. The setting item buttons B11 to B17 indicate a large classification of setting items concerning the system setting. For example, if a touch operation (tap operation) is performed on the setting item button B15 "user management," the panel control portion 120 makes the display portion 82 display a user management screen 92 (screen corresponding to the setting item button B15) shown in FIG. 6 which is one of one-more downward layer screens than the system menu screen 91. In the meantime, although not shown, in a case where a touch operation is performed on a setting item button of the setting item buttons B11 to B17 other than the setting item button B15, a screen corresponding to the setting item button undergoing the touch operation is displayed on the display portion 82.

The user management screen 92 is provided with an authentication method button B21, a user list button B22, a local permission button B23, a guest permission button B24, and an easy log-in setting button B25. The authentication method button B21 is a button that allows display of a screen for setting whether to perform local authentication (authentication based on user information registered in the multi-functional machine 100) or to perform network authentication (authentication based on user information registered in a server via a network). The user list button B22 is a button for registering and editing a user to whom use permission of the multi-functional machine 100 is given. The local permission button B23 is a button that allows display of a screen for putting, in user units, restriction on or lifting the restriction from functions (e.g., functions of copy and transmission) which a user can use. The guest permission button B24 is button that allows display of a screen for setting whether or not to permit a guest user (user who is not registered in the multi-functional machine 100 and the server), who is not usually permitted to use the multi-functional machine 100, to use the multi-functional machine 100. The easy log-in setting button B25 is a button that allows display of a screen for setting whether or not to validate the easy log-in function (function which allows log-in by only selecting a user icon) for a user registered in the multi-functional machine 100 or the server.

Figure 7:
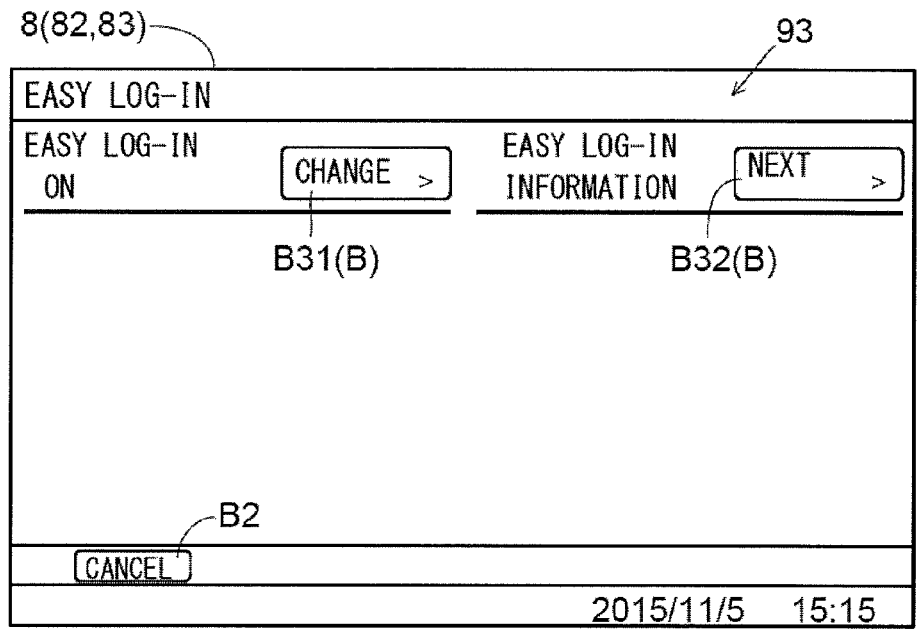
FIG. 7 is a view showing an example of a screen displayed on an operation panel according to an embodiment of the present disclosure.

For example, if a touch operation (tap operation) is performed on the easy log-in setting button B25 in the user management screen 92, the panel control portion 120 makes the display portion 82 display an easy log-in setting screen 93 (screen corresponding to the easy log-in setting button B25) shown in FIG. 7 which is one of one-more downward layer screens than the user management screen 92. In the meantime, although not shown, in a case where a touch operation is performed on a button other than the easy log-in setting button B25 in the user management screen 92, a screen corresponding to the button undergoing the touch operation is displayed on the display portion 82.

The easy log-in setting screen 93 is provided with an on-off setting button B31 and an easy log-in information button B32. The on-off setting button B31 is a button that allows display of a screen for setting whether to validate the easy log-in function or not. The easy log-in information button B32 is a button that allows display of a screen for indicating information of a user who is permitted to use the easy log-in function.

Figure 8:
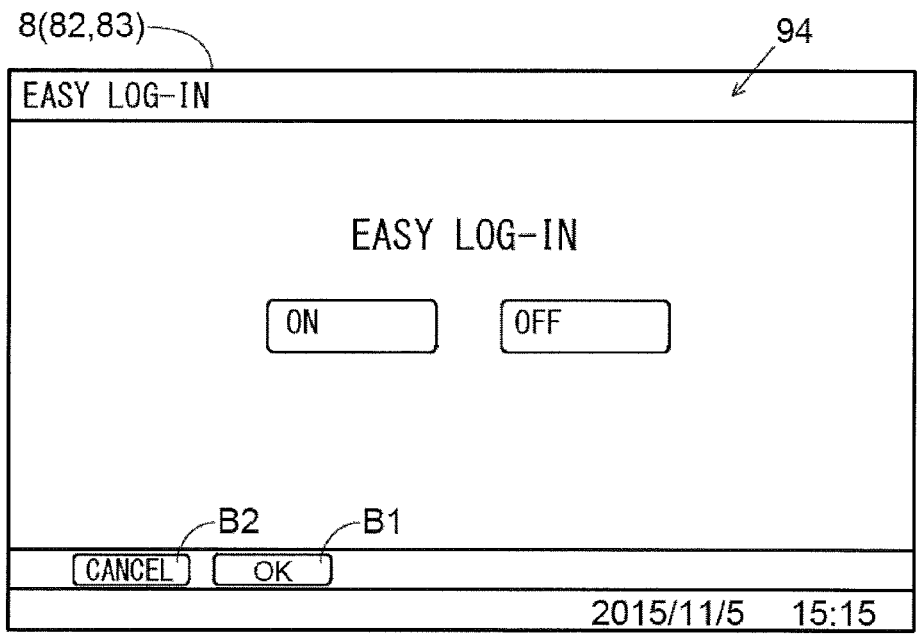
FIG. 8 is a view showing an example of a screen displayed on an operation panel according to an embodiment of the present disclosure.

In this easy log-in setting screen 93, if a touch operation (tap operation) is performed on the on-off setting button B31, the panel control portion 120 makes the display portion 82 display an on-off setting screen 94 shown in FIG. 8 which is one of one-more downward layer screens than the easy log-in setting screen 93. This on-off setting screen 94 is a screen for accepting whether to validate (on) or invalidate (off) the easy log-in function.

Figure 9:
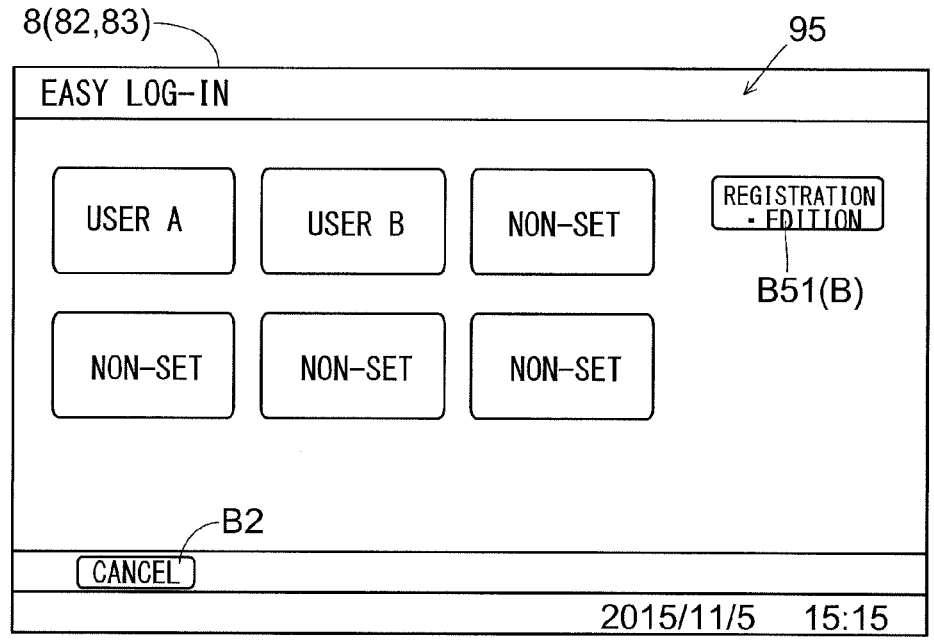
FIG. 9 is a view showing an example of a screen displayed on an operation panel according to an embodiment of the present disclosure.
Figure 10:
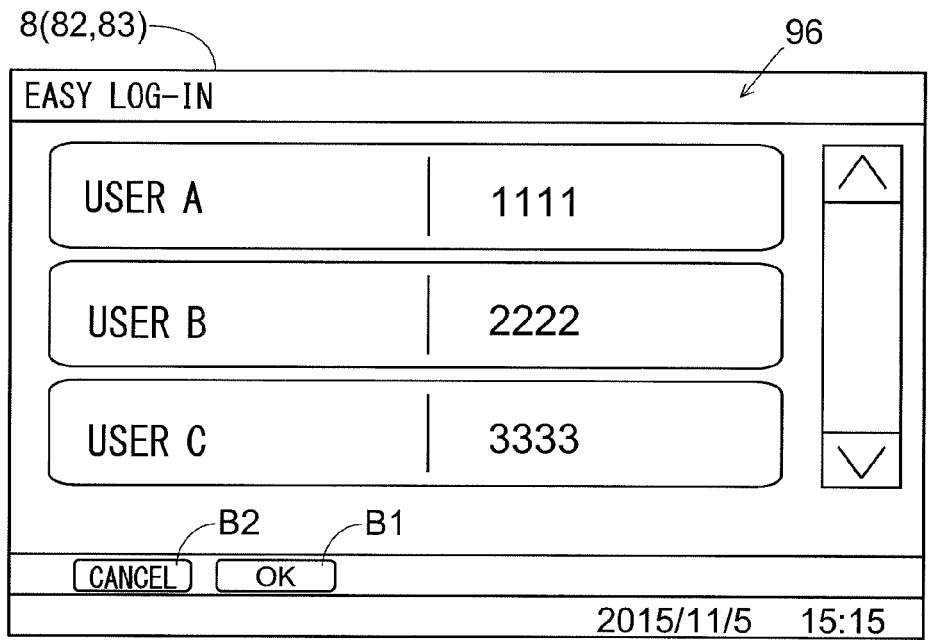
FIG. 10 is a view showing an example of a screen displayed on an operation panel according to an embodiment of the present disclosure.

Besides, in the easy log-in setting screen 93 (see FIG. 7), if a touch operation (tap operation) is performed on the easy log-in information button B32, the panel control portion 120 makes the display portion 82 display an easy log-in information screen 95 shown in FIG. 9 which is one of one-more downward layer screens than the easy log-in setting screen 93, and indicates a user who is permitted to use the easy log-in function. And, if a touch operation (tap operation) is performed on a registration-edition button B51 disposed in the easy log-in information screen 95, the panel control portion 120 makes the display portion 82 display a registration-edition screen 96 shown in FIG. 10. This registration-edition screen 96 is a screen for selecting a user to whom use permission of the easy log-in function is given.

The on-off setting screen 94 (see FIG. 8) and the registration-edition screen 96 (see FIG. 10) are each provided therein with a decision button B1 (OK button) and a cancel button B2. And, if a touch operation (tap operation) is performed on the decision button B1 of the on-off setting screen 94, the panel control portion 120 decides whether to validate or invalidate the easy log-in function; if a touch operation (tap operation) is performed on the decision button B1 of the registration-edition screen 96, the panel control portion 120 decides a user to whom the use permission of the easy log-in function is given. Thereafter, the panel control portion 120 switches the display screen to the uppermost layer screen.

On the other hand, if a touch operation (tap operation) is performed on the cancel button B2, the panel control portion 120 does not change the setting content (holds default setting content). And, the panel control portion 120 switches the display screen from the screen in the current display to a one-more upward layer screen than the screen in the current display. For example, if the screen in the current display is the registration-edition screen 96, the display screen returns to the easy log-in information screen 95. Or, the display screen may be switched to the uppermost layer screen without changing the setting content. The cancel button B2 is also disposed in the screens of the user management screen 92 (see FIG. 6), easy log-in setting screen 93 (see FIG. 7), easy log-in information screen 95 (see FIG. 9) and the like.

In the meantime, the setting item buttons B11 to B17 disposed in the system menu screen 91 (see FIG. 5) correspond to a "button (button for switching a display screen to a one-more downward layer screen)". Besides, also the authentication method button B21, user list button B22, local permission button B23, guest permission button B24, and easy log-in setting button B24 which are disposed in the user management screen 92 (see FIG. 6) correspond to the "button." Besides, also the on-off setting button B31 and easy log-in information button B32 which are disposed in the easy log-in setting screen 93 (see FIG. 7) correspond to the "button." Further, also the registration-edition button B51 disposed in the easy log-in information screen 95 (see FIG. 9) corresponds to the "button." Hereinafter, there is a case where the button for switching a display screen to a one-more downward layer screen is simply called a button B to perform description.

<Gradual Shift Mode>
(Gradual Shift of Display Screen)

When the touch panel portion 83 accepts a predetermined first operation during display of a screen in which the button B is disposed, the panel control portion 120 goes to a gradual shift mode. For example, the touch panel portion 83 accepts a long-time push operation on the button B as the first operation. Here, the long-time push operation is an operation of keeping a touch on a display region of the button B until a predetermined period (e.g., 0.5 second to a few seconds) elapses.

And, upon detecting the first operation on the touch panel portion 83, the panel control portion 120 uses the detection as a trigger to make the display portion 82 perform a gradual shift of the display screen. Here, the display portion 82 uses a screen in which the button B undergoing the first operation is disposed as a shift start screen PS1, and a one-more downward layer screen than the shift start screen PS1 as a shift target screen PS2. In the meantime, the shift target screen PS2 is a screen corresponding to the button B which is one of the buttons B disposed in the shift star screen PS1 and undergoes the first operation, and is a screen to be displayed when a usual touch operation (tap operation) is performed on the button B that undergoes the first operation. And, the display portion 82 gradually erases the shift start screen PS1 and gradually increases a display percentage of the shift target screen PS2, thereby shifts the display screen from the shift start screen PS1 to the shift target screen PS2. According to this structure, when going to a gradual shift mode, it is possible to begin with a shift to a desired screen.

In the meantime, of the screens shown in FIG. 5 to FIG. 10, the system menu screen 91, the user management screen 92, the easy log-in setting screen 93 and the easy log-in information screen 95 can become the shift start screen PS1. Besides, the user management screen 92, the easy log-in setting screen 93, the on-off setting screen 94, the easy log-in information screen 95 and the registration-edition screen 96 can become the shift target screen PS2.

Figure 11:
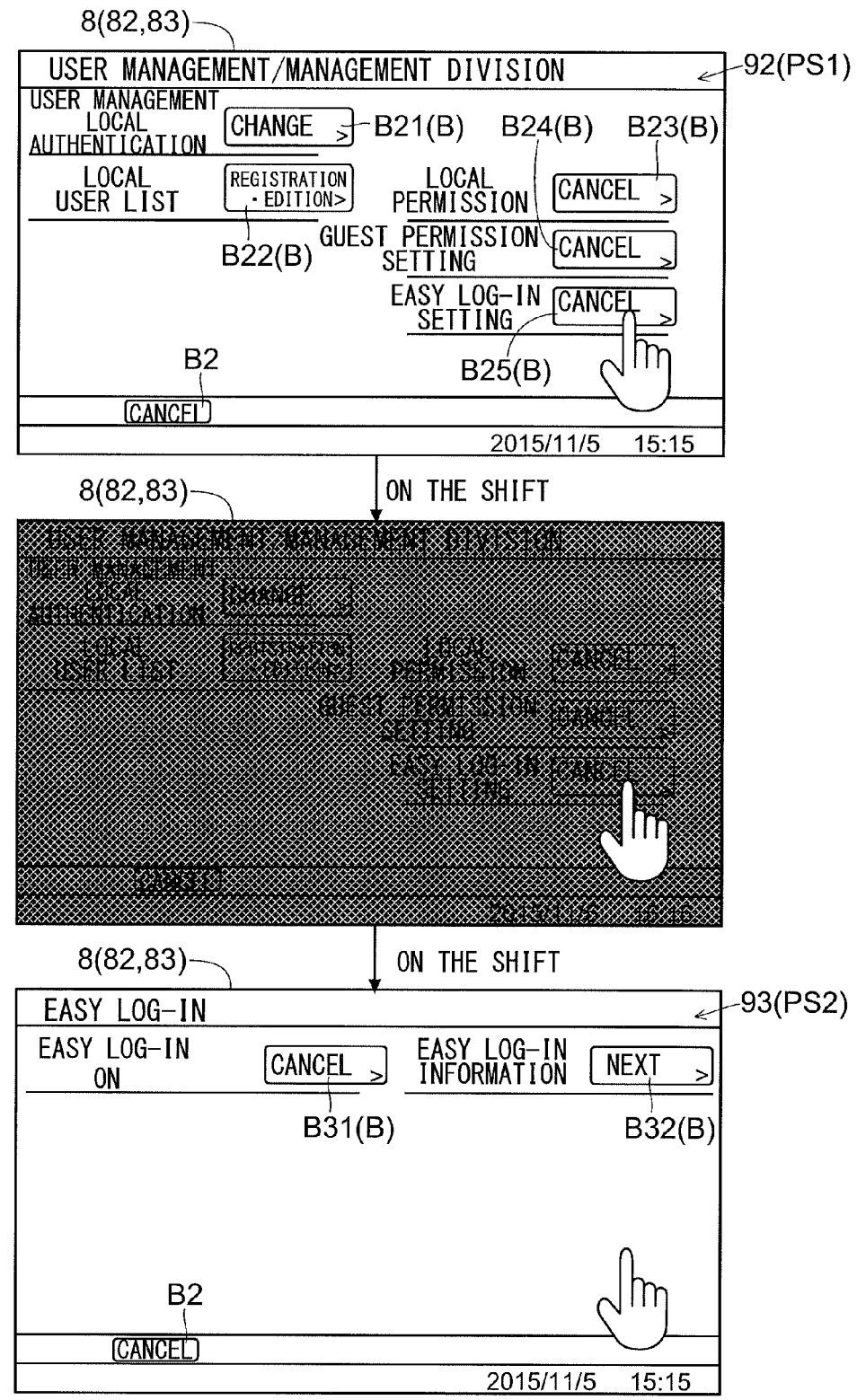
FIG. 11 is a view in a case (case where a shift from a shift start screen to a shift target screen is performed) where an operation panel according to an embodiment of the present disclosure performs display in a gradual shift mode.

Hereinafter, as an example, with reference to FIG. 11, a case is described where a gradual shift from the user management screen 92 to the easy log-in setting screen 93 is performed.

The panel control portion 120 detects presence of the first operation on the touch panel portion 83 during display of the user management screen 92. And, upon detecting the first operation on the touch panel portion 83, the panel control portion 120 goes to the gradual shift mode. In the meantime, in the case where the gradual shift from the user management screen 92 to the easy log-in setting screen 93 is performed, the first operation may be performed on the easy log-in setting button B25 in the user management screen 92. Here, it is assumed that the first operation is performed on the easy log-in setting button B25.

Upon detecting the first operation on the easy log-in setting button B25 in the user management screen 92 and going to the gradual shift mode, the panel control portion 120 uses the user management screen 92 as the shift start screen PS1, uses the easy log-in setting screen 93 as the shift target screen PS2, and makes the display portion 82 perform gradual display (gradual shift from the user management screen 92 to the easy log-in setting screen 93) from the shift start screen PS1 to the shift target screen PS2. For example, the display portion 82 performs the gradual shift from the shift start screen PS1 to the shift target screen PS2 in 16 steps (16 stages).

In the case where the gradual shift is performed in the 16 steps, the display portion 82 divides pixels of the shift start screen PS1 into blocks (e.g., 4×4 pixel blocks) each of which includes a unit of 16 dots. And, the display portion 82 uses, as a star point, a time point when the first operation is performed on the touch panel portion 83, and replaces the pixels in the blocks with pixels of the shift target screen one after another at a constant period.

As another example, the pixels of the shift start screen PS1 may be replaced with the pixels of the shift target screen PS2 in line units from any one of the top, bottom, left and right edges of the shift start screen PS1 to the opposite edge. Or, the shift target screen PS2 may appear like sliding from the top, bottom, left and right edges of the shift start screen PS1.

In this way, the user management screen 92 gradually disappears and the easy log-in setting screen 93 gradually appears. In other words, the display screen is gradually (in an animation manner) switched from the user management screen 92 to the easy log-in setting screen 93.

As described above, in the shift of the display screen in the gradual shift mode, the shift start screen PS1 gradually disappears, while the shift target screen PS2 gradually appears; accordingly, it is possible to achieve distinction from a usual display screen shift. In other words, it is easy for the user to understand whether the gradual shift mode starts or not.

(List Display of Downward Layer Screens)

After the gradual shift from the shift start screen PS1 to the shift target screen PS2 is completed, namely, after the shift start screen PS1 entirely goes away (disappears) and the shift target screen PS2 is completely displayed, when the touch on the touch panel portion 83 is not lifted and the first operation is continued on the touch panel portion 83, the panel control portion 120 continues the gradual shift mode. In this case, if there are a plurality of one-more downward layer screens than the shift target screen PS2 whose shift is completed, the panel control portion 120 reduces sizes of the plurality of downward layer screens to sizes smaller than a usual screen size and makes the display portion 82 display a list screen PS3 that disposes the plurality of reduced-sized downward layer screens in the same screen.

According to this structure, by means of only one operation (first operation), it is possible to confirm a one-more downward layer screen than a screen in current display, and even if there are a plurality of downward layer screens on a one-more downward layer than the downward layer screen, it is possible to confirm all of the plurality of downward layer screens. As a result of this, when confirming the more downward layer screens than the screen in the current display, it is unnecessary to perform the screen switchover operation many times; accordingly, convenience for the user improves (operations performed by the user decrease).

Hereinafter, as a specific example, with reference to FIG. 12 and FIG. 13, a case is described where after the gradual shift from the user management screen 92 to the easy log-in setting screen 93 is completed, the touch on the touch panel portion 83 is not lifted and the first operation on the touch panel portion 83 is continued.

On the one-more downward layer than the easy log-in setting screen 93 whose shift is completed, there are the on-off setting screen 94 (see FIG. 8) to be displayed when a usual touch operation is performed on the on-off setting button B31 and the easy log-in information screen 95 (see FIG. 9) to be displayed when a usual touch operation is performed on the easy log-in information button B32. Accordingly, if the first operation on the touch panel portion 83 is continued even after the gradual shift from the user management screen 92 to the easy log-in setting screen 93 is completed, the panel control portion 120 makes the display portion 82 perform list display of the on-off setting screen 94 and easy log-in information screen 95.

Figure 12:
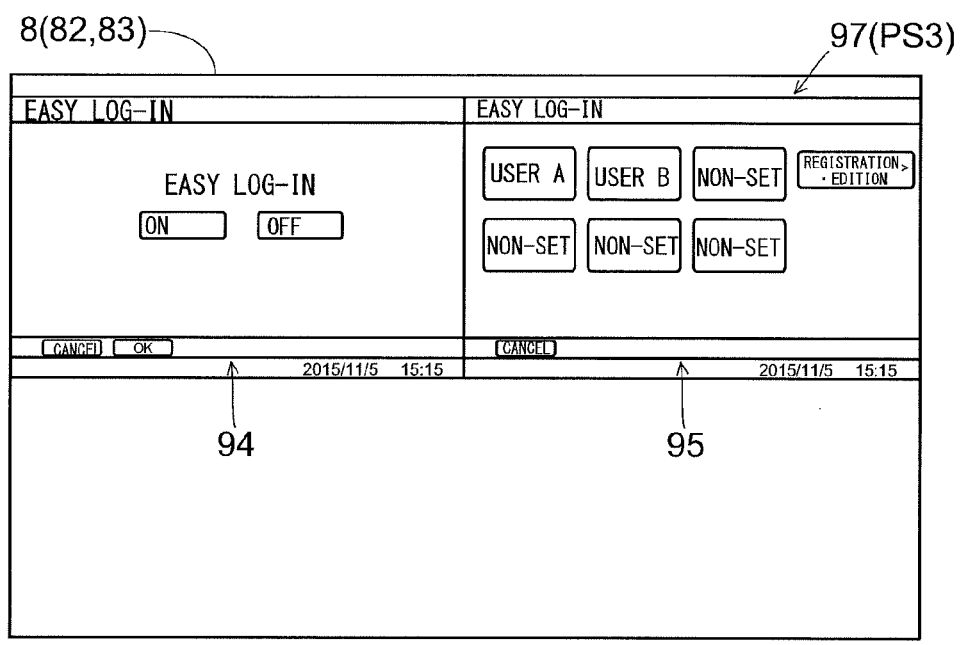
FIG. 12 is a view showing an example of a screen (list screen) displayed on an operation panel according to an embodiment of the present disclosure.
Figure 13:
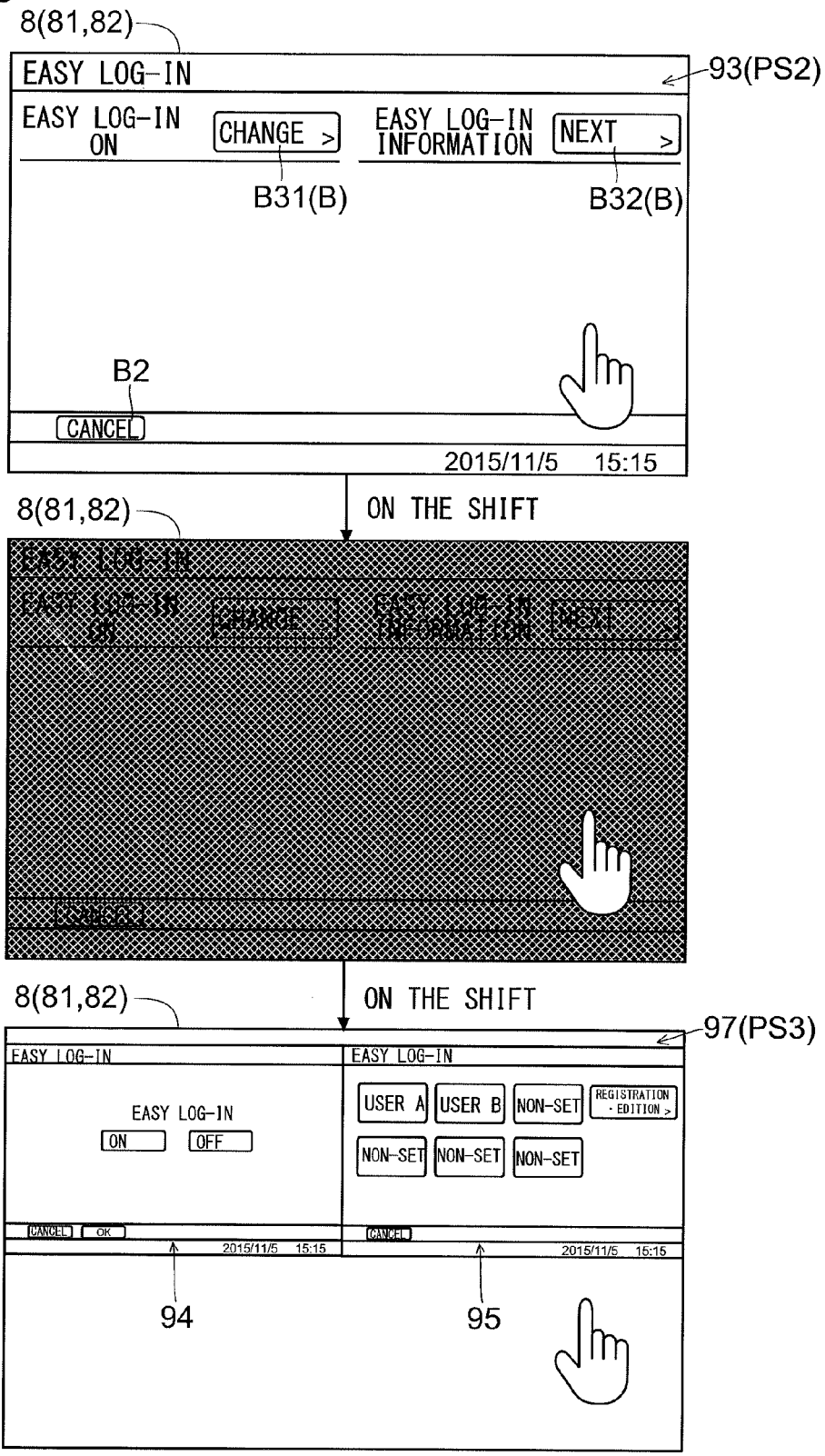
FIG. 13 is a view in a case (case where there are a plurality of downward layer screens on a one-more downward layer than a shift target screen) where an operation panel according to an embodiment of the present disclosure performs display in a gradual shift mode.

At this time, the display portion 82 displays a list screen 97 shown in FIG. 12 as a list screen PS3. This list screen 97 is a screen in which the sizes of the on-off setting screen 94 and easy log-in information screen 95 are reduced to sizes smaller the usual screen size and disposed in the same screen.

In the meantime, the display portion 82 performs the gradual shift when displaying the list screen PS3. For example, it is assumed that the display screen is switched from the easy log-in setting screen 93 to the list screen 97. In this case, as shown in FIG. 13, the display portion 82 gradually erases the easy log-in setting screen 93 while gradually increasing a display percentage of the list screen 97, thereby shifting the display screen from the easy log-in setting screen 93 to the list screen 97.

In the meantime, there are some cases where the easy log-in information button B32 is not disposed in the easy log-in setting screen 93. For example, if the easy log-in function is set to be invalid, the easy log-in information button B32 is not disposed in the easy log-in setting screen 93. And, as in this case, if the easy log-in information button B32 is not disposed in the easy log-in setting screen 93, it is only the on-off setting screen 94 that exists on the one-more downward layer than the easy log-in setting screen 93.

Figure 14:
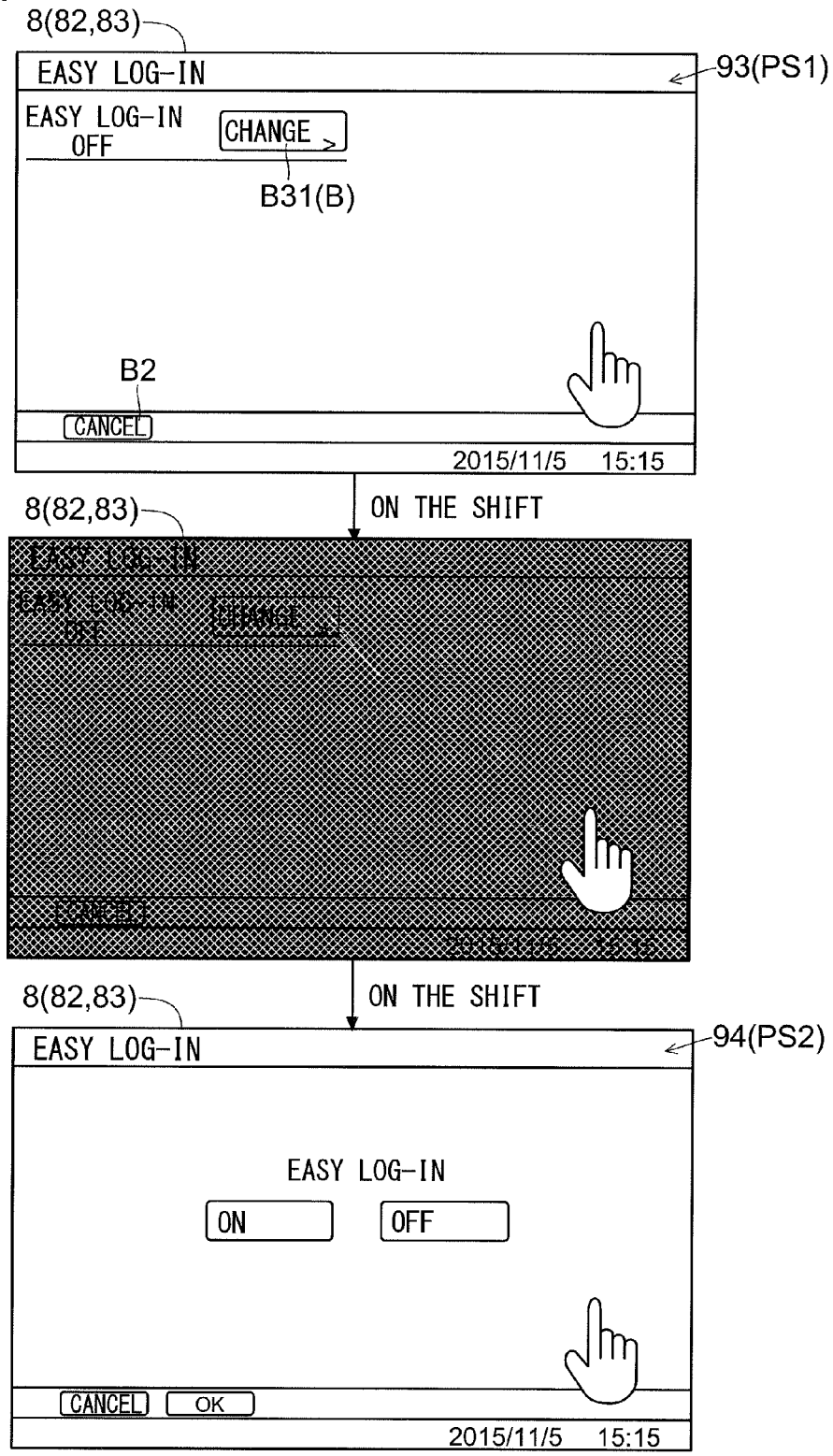
FIG. 14 is a view in a case (case where there is one downward layer screen existing on a one-more downward layer than a shift target screen) where an operation panel according to an embodiment of the present disclosure performs display in a gradual shift mode.

In this case, if the first operation is continued on the touch panel portion 83 even after the gradual shift from the user management screen 92 to the easy log-in setting screen 93 is completed, as shown in FIG. 14, the panel control portion 120 makes the display portion 82 perform a gradual shift from the easy log-in setting screen 93 to the on-off setting screen 94. In other words, when the first operation on the touch panel portion 83 is continued even after the shift from the shift star screen PS1 to the shift target screen PS2 is completed, if it is only one downward layer screen that exists on the one-more downward layer than the shift target screen PS2 whose shift is completed, the panel control portion 120 makes the display portion 82 perform a gradual shift (continue the gradual shift) in which the shift target screen PS2 whose shift is completed is used as a new shift start screen PS1. According to this structure, as long as only one downward layer screen exists on the one-more downward layer than the shift target screen PS2 whose shift is completed, the display screen shifts to downward layer screens one after another by only continuing the first operation; accordingly, it is possible to confirm the more downward layer screens than the screens in current display over a plurality of layers without performing additionally new operations. In the meantime, in the example of FIG. 14, the easy log-in setting screen 93 is used as a new shift start screen PS1 and the on-off setting screen 94 is used as a new shift target screen PS2.

(Selection of Downward Screen on List Screen)

When the touch panel portion 83 accepts a predetermined second operation that is a touch operation of selecting any screen of the plurality of downward layer screens during display of the list screen PS3, the panel control portion 120 makes the display portion 82 enlarge a size of a selected screen PS4 of the plurality of downward layer screens to the usual screen size and display the screen PS4. For example, the touch panel portion 83 accepts, as the second operation, a long-time push operation on any screen of the plurality of downward layer screens in the list screen SP3. The long-time push operation here is an operation of continuing to touch a display region of any screen of the plurality of downward layer screens for a predetermined period (e.g., 0.5 second to a few seconds).

According to this structure, a screen (selected screen PS4) desired to be confirmed is enlarged; accordingly, the work of confirming the screen becomes easy. In other words, the screen desired to be confirmed becomes easy to see (it is easy to understand what button or message is disposed). Besides, the operation of selecting a screen desired to be enlarged is straightforward and easy to understand.

However, if an operation of lifting the touch is performed after the first operation is accepted, the touch panel portion 83 accepts the operation as a fourth operation (operation of ending the gradual shift mode) described later. Accordingly, when performing the second operation on the touch panel portion 83, the touch position must be moved to any screen of the plurality of downward layer screens without lifting the touch after the first operation.

Upon detecting the second operation on the touch panel portion 83, the panel control portion 120 recognizes that the screen, which is one of the plurality of downward layer screens in the list screen PS3 and undergoes the second operation, is the selected screen PS4, and makes the display portion 82 perform enlarged display the selected screen PS4. At this time, the display portion 82 performs gradually (in an animation manner) the enlarged display of the selected screen PS4.

Figure 15:
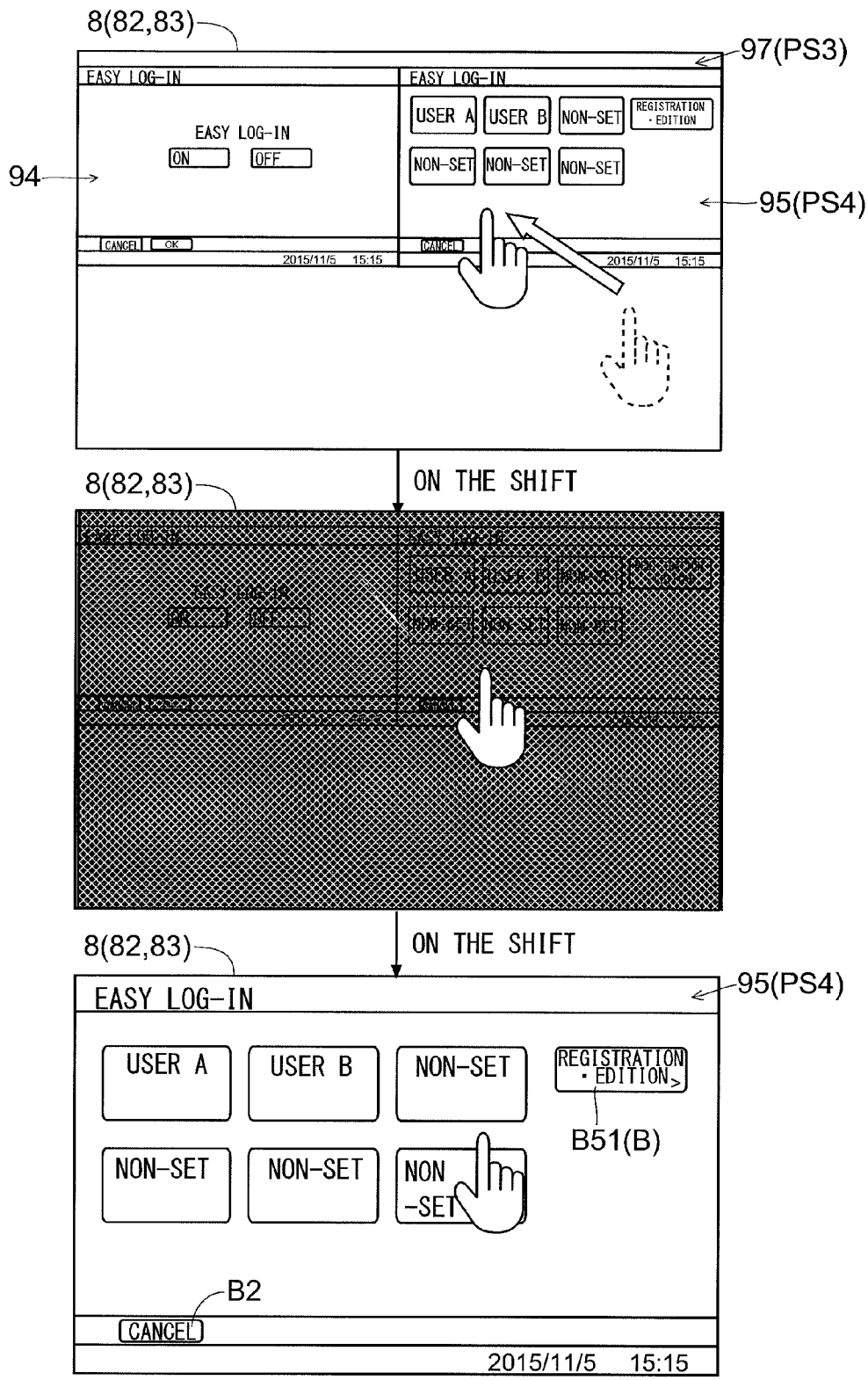
FIG. 15 is a view in a case (case where a selected screen is enlarged) where an operation panel according to an embodiment of the present disclosure performs display in a gradual shift mode.

Hereinafter, as a specific example, with reference to FIG. 15, a case is described where the list screen 97 is displayed as the list screen PS3. In the meantime, the on-off setting screen 94 and the easy log-in information screen 95 are disposed in the list screen 97.

The panel control portion 120 detects presence of the second operation on the touch panel portion 83 during display of the list screen 97. And, in a case where the second operation is detected in a display region of the on-off setting screen 94, the panel control portion 120 recognizes that the selected screen PS4 is the on-off setting screen 94, and makes the display portion 82 perform enlarged display of the on-off setting screen 94. On the other hand, in a case where the second operation is detected in a display region of the easy log-in information screen 95, the panel control portion 120 recognizes that the selected screen PS4 is the easy log-in information screen 95, and makes the display portion 82 perform enlarged display of the easy log-in information screen 95. FIG. 15 shows, as an example, the case where the easy log-in information screen 95 is enlarged and displayed.

(Gradual Shift Using a Selected Screen as a Shift Start Screen)

If the touch on the touch panel portion 83 is not lifted even after performing the enlarged display of the selected screen PS4, the panel control portion 120 sets the selected screen PS4 as a new shift start screen PS1. And, the panel control portion 120 makes the display portion 82 perform the gradual shift from the shift start screen PS1 (selected screen PS4) to the shift target screen PS2.

According to this structure, when the confirmation of a one-more downward layer screen than the selected screen PS4 is desired to be performed, by means of the easy operation of only continuing the touch, it is possible to continue the shift of the display screen by using the selected screen PS4 as a new shift start screen PS1.

Figure 16:
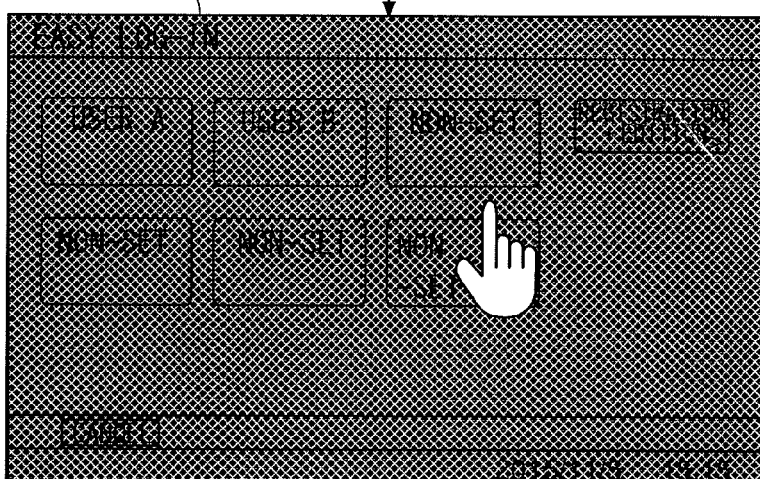
FIG. 16 is a view in a case (case where a selected screen is set as a shift start screen) where an operation panel according to an embodiment of the present disclosure performs display in a gradual shift mode.

Hereinafter, as a specific example, a case is described with reference to FIG. 16 where a gradual shift from the easy log-in information screen 95 as the selected screen PS4 to the registration-edition screen 96 is performed.

The panel control portion 120 detects whether the touch on the touch panel portion 83 is continued or not after the easy log-in information screen 95 is enlarged and displayed. And, in a case where it is detected that the touch on the touch panel portion 83 is continued, the panel control portion 120 sets the easy log-in information screen 95 (selected screen PS4) as the shift start screen PS1, sets the registration-edition screen 96 as the shift target screen PS2, and makes the display portion 82 perform the gradual shift from the easy log-in information screen 95 to the registration-edition screen 96.

(Shift to Upward Layer Screen)

As long as the touch on the touch panel portion 83 is continued after going to the gradual shift mode, the panel control portion 120 does not end the gradual shift mode. In other words, the display portion 82 performs the gradual shift from the shift start screen PS1 to the shift target screen PS2, and continues the gradual shift by setting the shift target screen PS2 as a new shift start screen PS1. Or, if there are a plurality of downward layer screens on the one-more downward layer than the shift start screen PS1, the display portion 82 displays the list screen PS3, and if any screen of the downward layer screens in the list screen PS3 is selected, the display portion 82 enlarges and displays the selected screen PS4 (the selected screen PS4 is displayed as a new shift start screen PS1).

However, there is a case where the upward layer screen than the screen in current display is desired to be confirmed again. Accordingly, when the touch panel portion 83 accepts a predetermined third operation after going to the gradual shift mode, the panel control portion 120 instructs the display portion 83 to return the display screen to the screen before the shift that is displayed immediately before an acceptance time of the third operation. In other words, the panel control portion 120 makes the display portion 82 perform a reverse shift of the display screen. For example, the touch panel portion 83 accepts, as the third operation, an operation of touching two points in a screen.

According to this structure, even after going to the gradual shift mode, it is possible to confirm again the more upward layer screen than the screen in current display; accordingly, the convenience for the user improves. Besides, by means of an easy operation, it is possible to return from the screen in current display to the upward layer screen.

However, if an operation of lifting the touch is performed after going to the gradual shift mode, the touch panel portion 83 accepts the operation as the fourth operation (operation of ending the gradual shift mode) described later. Accordingly, when performing the third operation on the touch panel portion 83, another point in the screen must be touched with the one-point touch at the first operation time (the second operation time also is included) continued.

Figure 17:
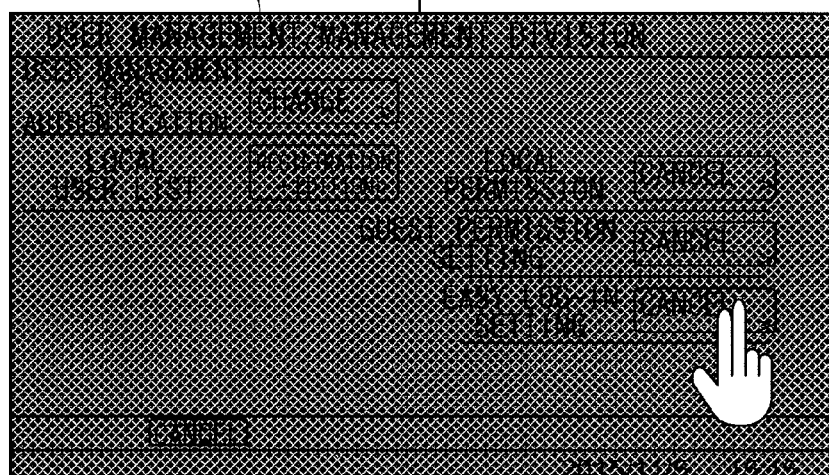
FIG. 17 is a view in a case (case where a display screen is returned to an upward layer screen) where an operation panel according to an embodiment of the present disclosure performs display in a gradual shift mode.

For example, as shown in FIG. 17, it is assumed that the touch panel portion 83 accepts the third operation when the gradual shift from the user management screen 92 to the easy log-in setting screen 93 is completed. In this case, the screen before the shift that is displayed immediately before the acceptance time of the third operation becomes the user management screen 92. Accordingly, the panel control portion 120 makes the display portion 82 display the user management screen 92. In the meantime, when returning from the easy log-in setting screen 93 to the user management screen 92, the gradual shift may be performed or may not be performed.

In the meantime, there is a case where the touch panel portion 83 accepts the third operation during the shift from the user management screen 92 to the easy log-in setting screen 93. Also in this case, the screen before the shift, which is displayed immediately before the acceptance time of the third operation, is the user management screen 92. Accordingly, the panel control portion 120 makes the display portion 82 display the user management screen 92.

Figure 18:
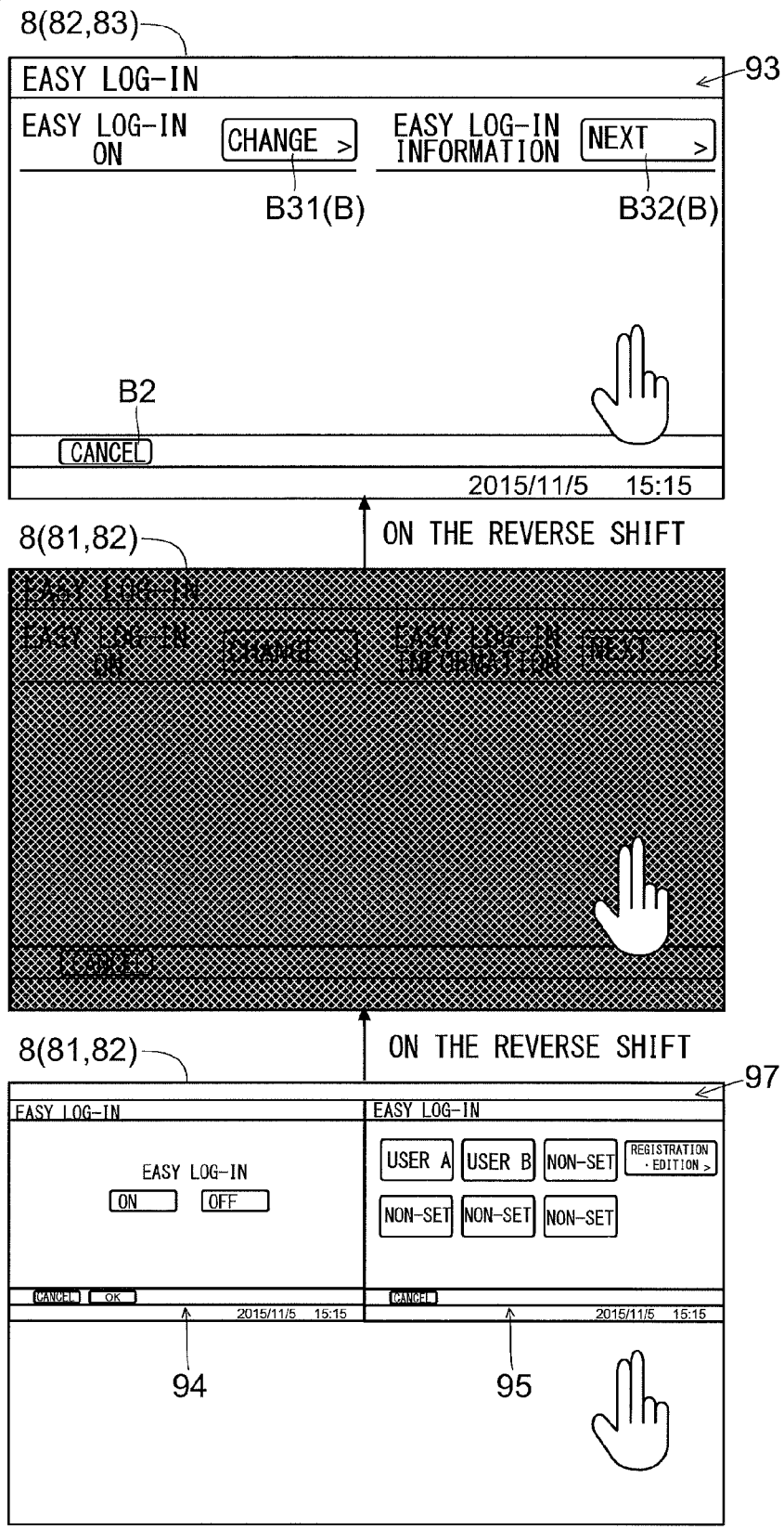
FIG. 18 is a view in a case (case where a display screen is returned to an upward layer screen) where an operation panel according to an embodiment of the present disclosure performs display in a gradual shift mode.

Further, as another example, as shown in FIG. 18, it is assumed that the touch panel portion 83 accepts the third operation when the gradual shift from the easy log-in setting screen 93 to the list screen 97 is completed. In this case, the screen before the shift that is displayed immediately before the acceptance time of the third operation is the easy log-in setting screen 93. Accordingly, the panel control portion 120 makes the display portion 82 display the easy log-in setting screen 93. In the meantime, when returning from the list screen 97 to the easy log-in setting screen 93, the gradual shift may be performed or may not be performed.

In the meantime, if the touch on one of the two points touched at the third operation time is lifted after (the duration when the return is performed is also included) the third operation on the touch panel portion 83 is accepted to return the display screen to the screen before the shift, the panel control portion 120 makes the display portion 82 resume the gradual shift to the downward layer screen on the assumption that the first operation is being performed on the touch panel portion 83.

(End of Gradual Shift Mode)

When the touch panel portion 83 accepts the predetermined fourth operation after going to the gradual shift mode, the panel control portion 120 ends the gradual shift mode. For example, the touch panel portion 83 accepts, as the fourth operation, the operation (operation of taking all fingers off the touch panel portion 83) of lifting the touch from the touch panel portion 83. According to this structure, it is possible to easily end the gradual shift mode.

When ending the gradual shift mode, the panel control portion 120 makes the display portion 82 display the screen that is displayed at the time of shift to the gradual shift mode. In other words, if the first operation on any one of the buttons B in the user management screen 92 is accepted to shift to the gradual shift mode, the panel control portion 120 returns the display screen to the user management screen 92 and ends the gradual shift mode. According to this structure, even in a case of going to the gradual shift mode and shifting from the screen at the time of shift to the gradual shift mode to a screen over many downward layer screens, it is possible to easily return to the screen at the time of shift to the gradual shift mode.

Or, if the shift start screen PS1 or the shift target screen PS2 is displayed when ending the gradual shift mode, the panel control portion 120 makes the display portion 83 display the screen in the current display as it is. For example, if the display screen at the time of ending the gradual shift mode is the easy log-in setting screen 93, the gradual shift mode is ended with the easy log-in setting screen 93 displayed. In the meantime, in a case where the fourth operation is performed during the shift of the display screen, a screen having the larger display percentage at the operation time may be displayed. According to this structure, by performing the fourth operation (ending the gradual shift mode) when a desired screen is displayed after going to the gradual shift mode, it is possible to continue the setting on the desired screen; accordingly, the convenience for the user more improves.

It should be considered that the embodiments disclosed this time are examples in all respects and are not limiting. The scope of the present disclosure is not indicated by the above description of the embodiments but by the claims, and all modifications within the scope of the claims and the meaning equivalent to the claims are covered.

What is claimed is:

1. A display input apparatus comprising:
    a display portion that displays a screen provided with a button for switching a display screen to a one-more downward layer screen, and
    a touch panel portion that accepts a touch operation for touching a screen of the display portion,
    wherein when the touch panel portion accepts a predetermined first operation during display of the screen provided with the button, the display portion starts display in a gradual shift mode in which the display portion sets the screen in a current display as a shift start screen, sets a one-more downward layer screen than the shift start screen as a shift target screen, gradually erases the shift start screen, and gradually increases a display percentage of the shift target screen, whereby the display screen is gradually shifted from the shift start screen to the shift target screen, and
    when the first operation is continued on the touch panel portion even after the shift to the shift target screen, if there are a plurality of downward layer screens that are screens on a one-more downward layer than the shift target screen, the display portion reduces sizes of the plurality of downward layer screens to sizes smaller than a usual screen size and displays a list screen that disposes the plurality of reduced-sized downward layer screens in a same screen.

2. The display input apparatus according to claim 1, wherein
    when the first operation is continued on the touch panel portion even after the shift to the shift target screen, if there is one downward layer screen existing on the one-more downward layer than the shift target screen, the display portion sets the shift target screen as a new shift start screen, sets a one-more downward layer screen than the new shift start screen as a new shift target screen, and gradually shifts the display screen from the new shift start screen to the new shift target screen.

3. The display input apparatus according to claim 1, wherein
    the touch panel portion accepts, as the first operation, a touch operation of a long-time pushing on the button in the screen of the display portion, and
    when shifting to the gradual shift mode, the display portion sets a screen, which is displayed when a usual touch operation is performed on the button that accepts the first operation, as the shift target screen.

4. The display input apparatus according to claim 1, wherein
    when the touch panel portion accepts, during the display of the list screen, a predetermined second operation that is a touch operation of selecting any screen of the plurality of downward layer screens in the list screen, the display portion enlarges a size of a selected screen to the usual screen size and displays the enlarged selected screen of the plurality of downward layer screens in the list screen.

5. The display input apparatus according to claim 4, wherein
    when the display portion displays the list screen, the touch panel portion accepts, as the second operation, a touch operation of a long-time pushing on any screen of the plurality of downward layer screens in the list screen without lifting the touch after the first operation, and
    the display portion enlarges and displays the screen, as the selected screen, which is one of the plurality of downward layer screens in the list screen and accepts the second operation.

6. The display input apparatus according to claim 5, wherein
    if the touch on the touch panel portion is not lifted even after the selected screen is enlarged and displayed, the display portion continues the display in the gradual shift mode by using the selected screen as a new shift start screen.

7. The display input apparatus according to claim 1, wherein
    when the touch panel portion accepts a predetermined third operation after starting of the display in the gradual shift mode, the display portion returns the display screen to a screen before the shift that is displayed immediately before an acceptance time of the third operation.

8. The display input apparatus according to claim 7, wherein
    the touch panel portion accepts, as the third operation, a touch operation of touching two points in the screen of the display portion.

9. The display input apparatus according to claim 8, wherein
    If an operation of lifting the touch from one of the two points touched at the third operation time is performed on the touch panel portion after or during a time the display screen is returned to the screen before the shift that is displayed immediately before the acceptance time of the third operation, the display portion resumes the gradual shift to the downward layer screen on assumption that the first operation is performed on the touch panel portion.

10. The display input apparatus according to claim 1, wherein when the touch panel portion accepts a predetermined fourth operation after starting of the display in the gradual shift mode, if the shift start screen or the shift target screen is displayed, the display portion ends the display in the gradual shift mode with the shift start screen or the shift target screen displayed.

11. The display input apparatus according to claim 1, wherein when the touch panel portion accepts a predetermined fourth operation after starting of the display in the gradual shift mode, the display portion displays a screen at a time the display in the gradual shift display is started and ends the gradual shift mode.

12. The display input apparatus according to claim 10, wherein the touch panel portion accepts, as the fourth operation, an operation of lifting the touch from the touch panel portion.

13. An image forming apparatus comprising the display input apparatus according to claim 1.

* * * * *